United States Patent
Fang et al.

(10) Patent No.: US 10,331,345 B2
(45) Date of Patent: Jun. 25, 2019

(54) METHOD AND APPARATUS FOR REDUCING SILENT DATA ERRORS IN NON-VOLATILE MEMORY SYSTEMS

(71) Applicant: Intel Corporation, Santa Clara, CA (US)

(72) Inventors: Wei Fang, El Dorado Hills, CA (US); Kiran Pangal, Fremont, CA (US); Prashant S. Damle, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/721,394

(22) Filed: Sep. 29, 2017

(65) Prior Publication Data

US 2019/0102088 A1    Apr. 4, 2019

(51) Int. Cl.
| | |
|---|---|
| *G11C 16/28* | (2006.01) |
| *G06F 3/06* | (2006.01) |
| *G06F 13/16* | (2006.01) |
| *G06F 11/10* | (2006.01) |
| *G06F 12/02* | (2006.01) |

(52) U.S. Cl.
CPC .......... *G06F 3/0602* (2013.01); *G06F 3/0653* (2013.01); *G06F 3/0683* (2013.01); *G06F 11/1044* (2013.01); *G06F 12/0246* (2013.01); *G06F 13/1668* (2013.01); *G06F 2003/0697* (2013.01)

(58) Field of Classification Search
CPC .... G06F 3/0602; G06F 3/0653; G06F 3/0683; G06F 11/1044; G06F 12/0246; G06F 13/1668

USPC ......................................................... 365/163
See application file for complete search history.

(56) References Cited

U.S. PATENT DOCUMENTS

| | | | | |
|---|---|---|---|---|
| 7,936,610 | B1* | 5/2011 | Melcher ................. | G11C 16/06 365/185.03 |
| 9,311,993 | B2* | 4/2016 | Shimura ............. | G11C 11/5642 |
| 9,431,123 | B2* | 8/2016 | Kim ...................... | G11C 29/028 |
| 9,685,206 | B2* | 6/2017 | Choi .................... | G11C 11/5642 |
| 2013/0336048 | A1* | 12/2013 | Hokenmaier ....... | G11C 13/0004 365/163 |
| 2015/0029796 | A1* | 1/2015 | Choi .................... | G11C 11/5642 365/189.05 |
| 2015/0049547 | A1* | 2/2015 | Kim ...................... | G11C 29/028 365/185.09 |
| 2015/0279474 | A1* | 10/2015 | Shimura ............. | G11C 11/5642 365/185.2 |
| 2016/0104539 | A1* | 4/2016 | Kim ...................... | G11C 16/28 365/185.12 |
| 2016/0189779 | A1* | 6/2016 | Guo ...................... | G11C 16/30 365/185.19 |
| 2018/0114580 | A1* | 4/2018 | Alrod .................... | G11C 16/26 |
| 2018/0130526 | A1* | 5/2018 | Hong ................. | G11C 13/0004 |

* cited by examiner

*Primary Examiner* — Xiaochun L Chen
(74) *Attorney, Agent, or Firm* — Alliance IP, LLC

(57) ABSTRACT

In one embodiment, an apparatus comprises a memory array comprising a plurality of phase change memory (PCM) cells; and a controller to determine to read data stored by the plurality of PCM cells independent of a read command from a host device; and in response to the determination to read data stored by the plurality of PCM cells independent of a read command from a host device, perform a dummy read operation on the plurality of PCM cells and perform an additional read operation on the plurality of PCM cells.

24 Claims, 6 Drawing Sheets

METHOD AND APPARATUS FOR REDUCING SILENT DATA ERRORS IN NON-VOLATILE MEMORY SYSTEMS

FIELD

The present disclosure relates in general to the field of computer development, and more specifically, to read operations for memory.

BACKGROUND

A storage device may include non-volatile memory, such as multi-stack three dimensional (3D) crosspoint memory cells. A demarcation voltage (VDM) applied to a memory cell during a read operation may allow a determination of the state of the memory cell (e.g., whether the memory cell stores a logical 0 or 1 value) based on the threshold voltage of the memory cell.

BRIEF DESCRIPTION OF THE DRAWINGS

Like reference numbers and designations in the various drawings indicate like elements.

DETAILED DESCRIPTION

Although the drawings depict particular computer systems, the concepts of various embodiments are applicable to any suitable computer systems. Examples of systems in which teachings of the present disclosure may be used include desktop computer systems, server computer systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

Figure 1:
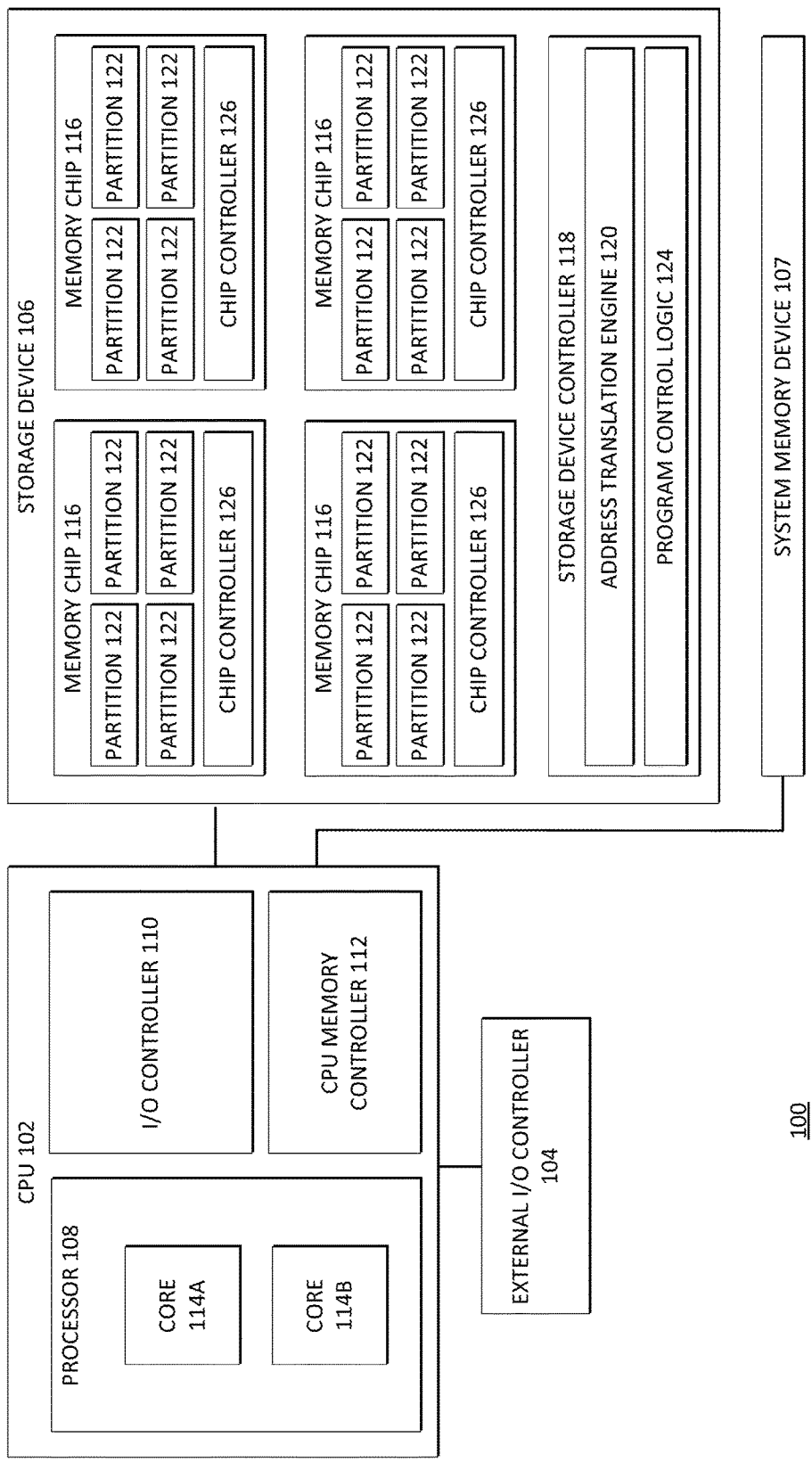
FIG. 1 illustrates a block diagram of components of a computer system in accordance with certain embodiments.

FIG. 1 illustrates a block diagram of components of a computer system 100 in accordance with certain embodiments. System 100 includes a central processing unit (CPU) 102 coupled to an external input/output (I/O) controller 104, a storage device 106, and system memory device 107. During operation, data may be transferred between a storage device 106 or system memory device 107 and the CPU 102. In various embodiments, particular memory access operations (e.g., read and write operations) involving a storage device 106 or system memory device 107 may be issued by an operating system and/or other software applications executed by processor 108. In various embodiments, a storage device 106 may include a storage device controller 118 and one or more memory chips 116 that each comprise any suitable number of memory partitions 122.

In various embodiments, a memory partition may include a 3D crosspoint memory array. In some embodiments, a 3D crosspoint memory array may comprise a transistor-less (i.e., at least with respect to the data storage elements of the memory) stackable crosspoint architecture in which memory cells sit at the intersection of row address lines and column address lines arranged in a grid.

During a read operation, a differential bias sometimes referred to as a demarcation voltage (VDM) may be applied across the terminals of the memory cell and the state of the memory cell may be sensed based on the reaction of the memory cell to the applied bias. For example, the memory cell may either go into a conductive ON state (logic one) or remain in a weakly conductive OFF state (logic zero). The applied voltage at which a memory cell transitions from being sensed as a logic one to being sensed as a logic zero may be termed a threshold voltage of the memory cell. Thus, as an example, when the VDM is higher than the threshold voltage of the memory cell, the memory cell may be sensed as storing a logic one and when the VDM is lower than the threshold voltage of the memory cell, the memory cell may be sensed as storing a logic zero.

In various situations, a threshold voltage of a memory cell of a non-volatile memory such as 3D crosspoint memory array may drift upwards as a function of time since the memory cell was last accessed (e.g., via a read or a write operation). The drift of the threshold voltages may result in an increase in a raw bit error rate (RBER) that indicates the incidence of erroneously read bits. For example, when the threshold voltage of a cell drifts above the VDM, the cell may be erroneously read as a logic 0 instead of a logic 1. In various embodiments, when errors are detected by error correction logic (e.g., an error correction code (ECC) engine) of storage device 106, the error correction logic may attempt to correct the errors. If the number of errors exceeds the correction capacity of the error correction logic, the error correction logic may fail to accurately correct the data (e.g., by reversing bits that were correctly read and/or by failing to correct bits that were misread). If the miscorrected read data is then written back into the memory cells (e.g., as part of a data refresh operation), the errors may be permanently written into the data. Such errors may be referred to as silent data corruption (SDC) errors.

Various embodiments of the present disclosure reduce or eliminate SDC errors that occur during the performance of read commands that are initiated by the storage device 106 (e.g., read commands initiated in order to refresh data) by leveraging the ability of a dummy read operation performed in response to the read command to reset the threshold voltage drift of the cells back to their proper levels (e.g., back to the threshold voltages the cells had after they were written to). Various embodiments may perform a dummy read operation in response to a read command initiated by the storage device 106, discard the read data, and then perform an additional read operation. Because the threshold voltage drift is corrected by the dummy read operation, the second read operation results in data with a much lower RBER (which is generally within the error correcting capabilities of the error correction logic), allowing the avoidance of silent data corruption errors.

Thus, various embodiments of the present disclosure may exploit the probabilistic nature of silent data corruption errors that are caused by an ECC engine miscorrecting a codeword. The probability of two miscorrections in any two consecutive reads is so low as to be negligible. Various embodiments described herein may be particularly useful when the correction capabilities of the ECC engine are limited relative to the amount of errors caused by threshold voltage drift and may allow for simpler ECC engines with reduced chip area and power consumption.

CPU 102 comprises a processor 108, such as a microprocessor, an embedded processor, a DSP, a network processor, a handheld processor, an application processor, a co-processor, an SOC, or other device to execute code (i.e., software instructions). Processor 108, in the depicted embodiment, includes two processing elements (cores 114A and 114B in the depicted embodiment), which may include asymmetric processing elements or symmetric processing elements. However, a processor may include any number of processing elements that may be symmetric or asymmetric. CPU 102 may be referred to herein as a host computing device (though a host computing device may be any suitable computing device operable to issue memory access commands to a storage device 106).

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 114 (e.g., 114A or 114B) may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 110 is an integrated I/O controller that includes logic for communicating data between CPU 102 and I/O devices, which may refer to any suitable logic capable of transferring data to and/or receiving data from an electronic system, such as CPU 102. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device. In a particular embodiment, an I/O device may comprise storage device controller 118 of storage device 106 coupled to the CPU 102 through I/O controller 110.

An I/O device may communicate with the I/O controller 110 of the CPU 102 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 110 and the underlying I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller may be located off-chip (i.e., not on the same chip as CPU 102) or may be integrated on the same chip as the CPU 102.

CPU memory controller 112 is an integrated memory controller that includes logic to control the flow of data going to and from one or more system memory devices 107. CPU memory controller 112 may include logic operable to read from a system memory device 107, write to a system memory device 107, or to request other operations from a system memory device 107. In various embodiments, CPU memory controller 112 may receive write requests from cores 114 and/or I/O controller 110 and may provide data specified in these requests to a system memory device 107 for storage therein. CPU memory controller 112 may also read data from a system memory device 107 and provide the read data to I/O controller 110 or a core 114. During operation, CPU memory controller 112 may issue commands including one or more addresses of the system memory device 107 in order to read data from or write data to memory (or to perform other operations). In some embodiments, CPU memory controller 112 may be implemented on the same chip as CPU 102, whereas in other embodiments, CPU memory controller 112 may be implemented on a different chip than that of CPU 102. I/O controller 110 may perform similar operations with respect to one or more storage devices 106.

The CPU 102 may also be coupled to one or more other I/O devices through external I/O controller 104. In a particular embodiment, external I/O controller 104 may couple a storage device 106 to the CPU 102. External I/O controller 104 may include logic to manage the flow of data between one or more CPUs 102 and I/O devices. In particular embodiments, external I/O controller 104 is located on a motherboard along with the CPU 102. The external I/O controller 104 may exchange information with components of CPU 102 using point-to-point or other interfaces.

A system memory device 107 may store any suitable data, such as data used by processor 108 to provide the functionality of computer system 100. For example, data associated with programs that are executed or files accessed by cores 114 may be stored in system memory device 107. Thus, a system memory device 107 may include a system memory that stores data and/or sequences of instructions that are executed or otherwise used by the cores 114. In various embodiments, a system memory device 107 may store persistent data (e.g., a user's files or instruction sequences) that maintains its state even after power to the system memory device 107 is removed. A system memory device 107 may be dedicated to a particular CPU 102 or shared with other devices (e.g., one or more other processors or other devices) of computer system 100.

In various embodiments, a system memory device 107 may include a memory comprising any number of memory partitions, a memory device controller, and other supporting logic (not shown). A memory module may include non-volatile memory and/or volatile memory.

Non-volatile memory is a storage medium that does not require power to maintain the state of data stored by the medium. In various embodiments, non-volatile memory may be byte or block addressable. Nonlimiting examples of nonvolatile memory may include any or a combination of: solid state memory (such as planar or 3-dimensional (3D) NAND flash memory or NOR flash memory), 3D crosspoint memory, phase change memory (e.g., memory that uses a chalcogenide glass phase change material in the memory cells), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, anti-ferroelectric memory, nanowire memory, electrically erasable programmable read-only memory (EEPROM), a memristor, single or multi-level phase change memory (PCM), Spin Hall Effect Magnetic RAM (SHE-MUM), and Spin Transfer Torque Magnetic RAM (STTRAM), a resistive memory, magnetoresistive random access memory (MRAM) memory that incorporates memristor technology, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory.

Volatile memory is a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In some embodiments, any portion of memory 107 that is volatile memory can comply with JEDEC standards including but not limited to Double Data Rate (DDR) standards, e.g., DDR3, 4, and 5, or Low Power DDR4 (LPDDR4) as well as emerging standards.

A storage device 106 may store any suitable data, such as data used by processor 108 to provide functionality of computer system 100. For example, data associated with programs that are executed or files accessed by cores 114A and 114B may be stored in storage device 106. In various embodiments, a storage device 106 may store persistent data (e.g., a user's files or software application code) that maintains its state even after power to the storage device 106 is removed. A storage device 106 may be dedicated to CPU 102 or shared with other devices (e.g., another CPU or other device) of computer system 100.

In the embodiment depicted, storage device 106 includes a storage device controller 118 and four memory chips 116 each comprising four memory partitions 122 operable to store data, however, a storage device may include any suitable number of memory chips each having any suitable number of memory partitions. A memory partition 122 includes a plurality of memory cells operable to store data. The cells of a memory partition 122 may be arranged in any suitable fashion, such as in rows (e.g., wordlines) and columns (e.g., bitlines), three dimensional structures, sectors, or other manner. In various embodiments, the cells may be logically grouped into banks, blocks, subblocks, wordlines, pages, frames, bytes, slices, or other suitable groups. In various embodiments, a memory partition 122 may include any of the volatile or non-volatile memories listed above or other suitable memory. In a particular embodiment, each memory partition 122 comprises one or more 3D crosspoint memory arrays. 3D crosspoint arrays are described in more detail in connection with the following figures.

In various embodiments, storage device 106 may comprise a solid state drive; a memory card; a Universal Serial Bus (USB) drive; a Non-Volatile Dual In-line Memory Module (NVDIMM); storage integrated within a device such as a smartphone, camera, or media player; or other suitable mass storage device.

In a particular embodiment, one or more memory chips 116 are embodied in a semiconductor package. In various embodiments, a semiconductor package may comprise a casing comprising one or more semiconductor chips (also referred to as dies). A package may also comprise contact pins or leads used to connect to external circuits. In various embodiments, a memory chip may include one or more memory partitions 122.

Accordingly, in some embodiments, storage device 106 may comprise a package that includes a plurality of chips that each include one or more memory partitions 122. However, a storage device 106 may include any suitable arrangement of one or more memory partitions and associated logic in any suitable physical arrangement. For example, memory partitions 122 may be embodied in one or more different physical mediums, such as a circuit board, semiconductor package, semiconductor chip, disk drive, other medium, or any combination thereof.

Storage device 106 may include any suitable interface to communicate with CPU memory controller 112 or I/O controller 110 using any suitable communication protocol such as a DDR-based protocol, PCI, PCIe, USB, SAS, SATA, FC, System Management Bus (SMBus), or other suitable protocol. A storage device 106 may also include a communication interface to communicate with CPU memory controller 112 or I/O controller 110 in accordance with any suitable logical device interface specification such as NVMe, AHCI, or other suitable specification. In particular embodiments, storage device 106 may comprise multiple communication interfaces that each communicate using a separate protocol with CPU memory controller 112 and/or I/O controller 110.

Storage device controller 118 may include logic to receive requests from CPU 102 (e.g., via CPU memory controller 112 or I/O controller 110), cause the requests to be carried out with respect to the memory chips 116, and provide data associated with the requests to CPU 102 (e.g., via CPU memory controller 112 or I/O controller 110). Controller 118 may also be operable to detect and/or correct errors encountered during memory operations via an error correction code (ECC engine). In an embodiment, controller 118 also tracks, e.g., via a wear leveling engine, the number of times particular cells (or logical groupings of cells) have been written to in order to perform wear leveling, detect when cells are nearing an estimated number of times they may be reliably written to, and/or adjust read operations based on the number of times cells have been written to. In performing wear leveling, the storage device controller 118 may evenly spread out write operations among the cells of memory chips 116 in an attempt to equalize the number of operations (e.g., write operations) performed by each cell. In various embodiments, controller 118 may also monitor various characteristics of the storage device 106 such as the temperature or voltage and report associated statistics to the CPU 102. Storage device controller 118 can be implemented on the same circuit board or device as the memory chips 116 or on a different circuit board or device. For example, in some environments, storage device controller 118 may be a centralized storage controller that manages memory operations for multiple different storage devices 106 of computer system 100.

In various embodiments, the storage device 106 also includes program control logic 124 which is operable to control the programming sequence performed when data is written to or read from a memory chip 116. In various embodiments, program control logic 124 may provide the various voltages (or information indicating which voltages should be provided) that are applied to memory cells during the programming and/or reading of data (or perform other operations associated with read or program operations), perform error correction, and perform other suitable functions.

In various embodiments, the program control logic 124 may be integrated on the same chip as the storage device controller 118 or on a different chip. In the depicted embodiment, the program control logic 124 is shown as part of the storage device controller 118, although in various embodiments, all or a portion of the program control logic 124 may be separate from the storage device controller 118 and communicably coupled to the storage device controller 118. For example, all or a portion of the program control logic 124 described herein may be located on a memory chip 116. In various embodiments, reference herein to a "controller" may refer to any suitable control logic, such as storage device controller 118, chip controller 126, or a partition controller. In some embodiments, reference to a controller may contemplate logic distributed on multiple components, such as logic of a storage device controller 118, chip controller 126, and/or a partition controller.

In various embodiments, storage device controller 118 may receive a command from a host device (e.g., CPU 102), determine a target memory chip for the command, and communicate the command to a chip controller 126 of the target memory chip. In some embodiments, the storage device controller 118 may modify the command before sending the command to the chip controller 126.

In various embodiments, the storage device controller 118 may send commands to memory chips 116 to perform host-initiated read operations as well as device-initiated read operations. A host-initiated read operation may be performed in response to reception of a read command from a host coupled to the storage device 106, such as CPU 102. A device-initiated read operation may be a read operation that is performed in response to a device-initiated read command generated by the storage device 106 independent of receiving a read command from the host. In various embodiments, the storage device controller 118 may be the component that generates device-initiated read commands. The storage device 106 may initiate a device-initiated read command for any suitable reason. For example, upon power up of a storage device, the storage device 106 may initiate a plurality of read and write-back commands to re-initialize data of the storage device 106 (e.g., to account for any drift that has occurred while the storage device 106 or a portion thereof was powered off or has sat idle for a long period of time).

The chip controller 126 may receive a command from the storage device controller 118 and determine a target memory partition 122 for the command. The chip controller 126 may then send the command to a controller of the determined memory partition 122. In various embodiments, the chip controller 126 may modify the command before sending the command to the controller of the partition 122.

In some embodiments, all or some of the elements of system 100 are resident on (or coupled to) the same circuit board (e.g., a motherboard). In various embodiments, any suitable partitioning between the elements may exist. For example, the elements depicted in CPU 102 may be located on a single die (i.e., on-chip) or package or any of the elements of CPU 102 may be located off-chip or off-package. Similarly, the elements depicted in storage device 106 may be located on a single chip or on multiple chips. In various embodiments, a storage device 106 and a computing host (e.g., CPU 102) may be located on the same circuit board or on the same device and in other embodiments the storage device 106 and the computing host may be located on different circuit boards or devices.

The components of system 100 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem includes point-to-point multiplexing logic between various components of system 100, such as cores 114, one or more CPU memory controllers 112, I/O controller 110, integrated I/O devices, direct memory access (DMA) logic (not shown), etc. In various embodiments, components of computer system 100 may be coupled together through one or more networks comprising any number of intervening network nodes, such as routers, switches, or other computing devices. For example, a computing host (e.g., CPU 102) and the storage device 106 may be communicably coupled through a network.

Although not depicted, system 100 may use a battery and/or power supply outlet connector and associated system to receive power, a display to output data provided by CPU 102, or a network interface allowing the CPU 102 to communicate over a network. In various embodiments, the battery, power supply outlet connector, display, and/or network interface may be communicatively coupled to CPU 102. Other sources of power can be used such as renewable energy (e.g., solar power or motion based power).

Figure 2:
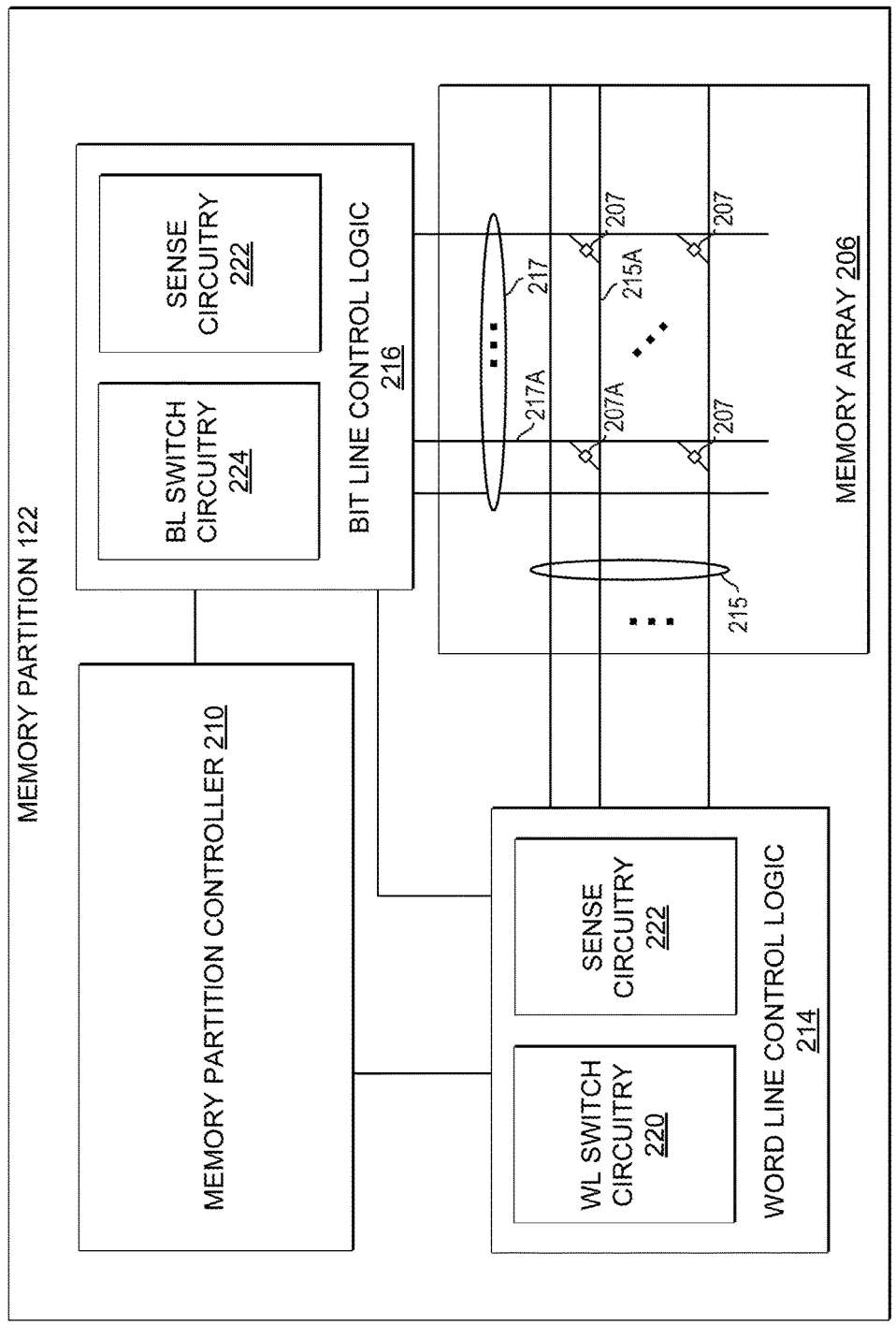
FIG. 2 illustrates a memory partition in accordance with certain embodiments.

FIG. 2 illustrates an example memory partition 122 in accordance with certain embodiments. In one embodiment, a memory partition 122 may include 3D crosspoint memory which may include phase change memory or other suitable memory types. In a particular embodiment, phase change memory may utilize a chalcogenide material for memory elements. A memory element is a unit of a memory cell that actually stores the information. In operation, phase change memory may store information on the memory element by changing the phase of the memory element between amorphous and crystalline phases. The material of a memory element (e.g., the chalcogenide material) may exhibit either a crystalline or an amorphous phase, exhibiting a low or high conductivity. Generally, the amorphous phase has a low conductivity (high impedance) and is associated with a reset state (logic zero) and the crystalline phase has a high conductivity (low impedance) and is associated with a set state (logic one). The memory element may be included in a memory cell 207 (e.g., a phase change memory cell) that also includes a selector, i.e., a select device coupled to the memory element. The select devices are configured to facilitate combining a plurality of memory elements into an array.

In some embodiments, a 3D crosspoint memory array 206 may comprise a transistor-less (i.e., at least with respect to the data storage elements of the memory) stackable crosspoint architecture in which memory cells 207 sit at the intersection of row address lines and column address lines arranged in a grid. The row address lines 215 and column address lines 217, called word lines (WLs) and bit lines (BLs), respectively, cross in the formation of the grid and each memory cell 207 is coupled between a WL and a BL where the WL and BL cross (i.e., crosspoint). At the point of a crossing, the WL and BL may be located at different vertical planes such that the WL crosses over the BL but does not physically touch the BL. As described above, the architecture may be stackable, such that a word line may cross over a bit line located beneath the word line and another bit line located above the word line. It should be noted that row and column are terms of convenience used to provide a qualitative description of the arrangement of WLs and BLs in crosspoint memory. In various embodiments, the cells of the 3D crosspoint memory array may be individually addressable. In some embodiments, bit storage may be based on a change in bulk resistance of a 3D crosspoint memory cell. In various embodiments, 3D crosspoint memory may include any of the characteristics of 3D XPoint memory manufactured by INTEL CORPORATION and/or MICRON TECHNOLOGY, INC.

During a programming operation (i.e., a write operation), the phase of the memory element may be changed by the application of a first bias voltage to the WL and a second bias voltage to the BL resulting in a differential bias voltage across the memory cell that may cause a current to flow in the memory element. The differential bias voltage may be maintained across the memory cell for a first time period sufficient to cause the memory element to "snap back" and then maintained for a second time period to transition the memory element from the amorphous state to the crystalline state or from the crystalline state to the amorphous state (e.g., via the application of heat produced by an electric current). Snap back is a property of the composite memory element that results in an abrupt change in conductivity and an associated abrupt change in the voltage across the memory element.

In a read operation, a target memory cell is selected via the application of a first bias voltage to the WL and a second bias voltage to the BL that cross at the target memory cell for a time interval. A resulting differential bias voltage (a demarcation read voltage (VDM)) across the memory element is configured to be greater than a maximum set voltage and less than a minimum reset voltage for the memory element. In a particular embodiment, a voltage of the WL (V(WL)) at the cell may go down and a voltage of the BL (i.e., V(BL)) at the cell may be pulled up such that V(BL)-V(WL) is equal to a total bias on the 3D crosspoint cell (i.e., the VDM).

In response to application of the VDM, the target memory element may or may not snap back, depending on whether the memory element is in the crystalline state (set) or the amorphous state (reset). Sense circuitry, coupled to the memory element, is configured to detect the presence or absence of snap back in a sensing time interval. The presence of snap back may then be interpreted as a logic one and the absence of snap back as a logic zero.

The differential bias at which a memory cell transitions from being sensed as a logic one (e.g., due to the memory cell snapping back) to being sensed as a logic zero (e.g., due to the memory cell not snapping back), may be termed a threshold voltage (sometimes referred to as a snap back voltage). Thus, when the VDM is higher than the threshold voltage of the memory cell, the memory cell may be sensed as storing a logic one and when the VDM is lower than the threshold voltage of the memory cell, the memory cell may be sensed as storing a logic zero.

In some embodiments, an applied bias such as the VDM of a read pulse may be high enough to only turn on 3D crosspoint cells in the crystalline state, which may have a lower threshold voltage than 3D crosspoint cells in the amorphous state. In some embodiments, the VDM may be supplied through negative and/or positive regulated nodes. For example, the bit-line electrode of the 3D crosspoint cell may be a positive regulated node and the word-line electrode coupled to the cell may supply the bias for VDM.

In the embodiment of FIG. 2, a memory partition 122 includes memory partition controller 210, word line control logic 214, bit line control logic 216, and memory array 206. A host device (e.g., CPU 102) may provide read and/or write commands including memory address(es) and/or associated data to memory partition 122 (e.g., via storage device controller 118 and chip controller 126) and may receive read data from memory partition 122 (e.g., via the chip controller 126 and storage device controller 118). Similarly, storage device controller 118 may provide host-initiated read or write commands or device-initiated read or write commands including memory addresses to memory partition 122 (e.g., via chip controller 126). Memory partition controller 210 (in conjunction with word line control logic 214 and bit line control logic 216) is configured to perform memory access operations, e.g., reading one or more target memory cells and/or writing to one or more target memory cells.

Memory array 206 corresponds to at least a portion of a 3D crosspoint memory (e.g., that may include phase change memory cells or other suitable memory cells) and includes a plurality of word lines 215, a plurality of bit lines 217 and a plurality of memory cells, e.g., memory cells 207. Each memory cell is coupled between a word line ("WL") and a bit line ("BL") at a crosspoint of the WL and the BL. Each memory cell includes a memory element configured to store information and may include a memory cell select device (i.e., selector) coupled to the memory element. Select devices may include ovonic threshold switches, diodes, bipolar junction transistors, field-effect transistors, etc. Memory array 206 may be configured to store binary data and may be written to (i.e., programmed) or read from.

Memory partition controller 210 may manage communications with chip controller 126 and/or storage device controller 118. In a particular embodiment, memory partition controller 210 may analyze one or more signals received from another controller to determine whether a command sent via a bus is to be consumed by the memory partition 122. For example, controller 210 may analyze an address of the command and/or a value on an enable signal line to determine whether the command applies to the memory partition 122. Controller 210 may be configured to identify one or more target WLs and/or BLs associated with a received memory address (this memory address may be a separate address from the memory partition address that identifies the memory partition 122, although in some embodiments a portion of an address field of a command may identify the memory partition while another portion of the address field may identify one or more WLs and/or BLs). Memory partition controller 210 may be configured to manage operations of WL control logic 214 and BL control logic 216 based, at least in part, on WL and/or BL identifiers included in a received command.

WL control logic 214 includes WL switch circuitry 220 and sense circuitry 222. WL control logic 214 is configured to receive target WL address(es) from memory partition controller 210 and to select one or more WLs for reading and/or writing operations. For example, WL control logic 214 may be configured to select a target WL by coupling a WL select bias voltage to the target WL. WL control logic 214 may be configured to deselect a WL by decoupling the target WL from the WL select bias voltage and/or by coupling a WL deselect bias voltage to the WL. WL control logic 214 may be coupled to a plurality of WLs 215 included in memory array 206. Each WL may be coupled to a number of memory cells corresponding to a number of BLs 217. WL switch circuitry 220 may include a plurality of switches, each switch configured to couple (or decouple) a respective WL, e.g., WL 215A, to WL select bias voltage to select the respective WL 215A. For example, switch circuitry 220 may include a plurality of transistors.

BL control logic 216 includes BL switch circuitry 224. In some embodiments, BL control logic 216 may also include sense circuitry, e.g., sense circuitry 222. BL control logic 216 is configured to select one or more BLs for reading and/or writing operations. BL control logic 216 may be configured to select a target BL by coupling a BL select bias voltage to the target BL. BL control logic 216 may be configured to deselect a BL by decoupling the target BL from the BL select bias voltage and/or by coupling a BL deselect bias voltage to the BL. BL switch circuitry 224 is similar to WL switch circuitry 220 except BL switch circuitry 224 is configured to couple the BL select bias voltage to a target BL.

Sense circuitry 222 is configured to detect the state of one or more sensed memory cells 207 (e.g., via the presence or absence of a snap back event during a sense interval), e.g., during a read operation. Sense circuitry 222 is configured to provide a logic level output related to the result of the read operation to, e.g., memory partition controller 210. For example, a logic level corresponding to a logic one may be output if the applied VDM is higher than the memory cell's threshold voltage or a logic zero if the applied VDM is lower than the memory cell's threshold voltage. In a particular embodiment, a logic one may be output if a snap back is detected and a logic zero may be output if a snap back is not detected.

As an example, in response to a signal from memory partition controller 210, WL control logic 214 and BL control logic 216 may be configured to select one or more target memory cells, e.g., memory cell 207, for a read operation by coupling WL 215A to WL select bias voltage and BL 217A to BL select bias voltage. One or both of sense circuitries 222 may then be configured to monitor WL 215A and/or BL 217A for a sensing interval in order to determine the state of the memory cell 217A (e.g., to determine whether or not a snap back event occurs). For example, if a sense circuitry 222 detects a snap back event, then memory cell 207A may be in the set state, but if a sense circuitry 222 does not detect a snap back event in the sensing interval, then memory cell 207A may be in the reset state.

Thus, WL control logic 214 and/or BL control logic 216 may be configured to select a target memory cell for a read operation, initiate the read operation, sense the selected memory cell (e.g., for a snap back event) in a sensing interval, and provide the result of the sensing to, e.g., memory partition controller 210.

In a particular embodiment, the sense circuitry 222 may include a word-line load connected to a word-line electrode to convert a current on the word-line electrode to a voltage that is a first input to a voltage comparator (i.e., sense amp) of the sense circuitry. An equivalent word-line load may be connected to a reference current to provide a voltage that is a second input to the voltage comparator. When a particular word-line and bit-line are selected in the array, the word-line load on the word-line electrode may convert the current on the selected bit-line to a voltage. In some embodiments, leakage components of the current can be mitigated by respectively selecting a bias for all other unselected word-lines and bit-lines that reduces or minimizes leakage. Capacitive components of the current can be mitigated by allowing sufficient time for the capacitive components to dissipate. The current that is converted to the first input to the voltage comparator may correspond with the current of the target memory cell. The reference current may be selected such that the current of the target memory cell is lower than the reference current before snapback of the target memory cell and higher than the reference current after snapback of the target memory cell. In this manner, an output of the voltage comparator may be indicative of a state of the target memory cell. A latch may be coupled to the output of the voltage comparator to store the output of the read operation.

Figure 3:
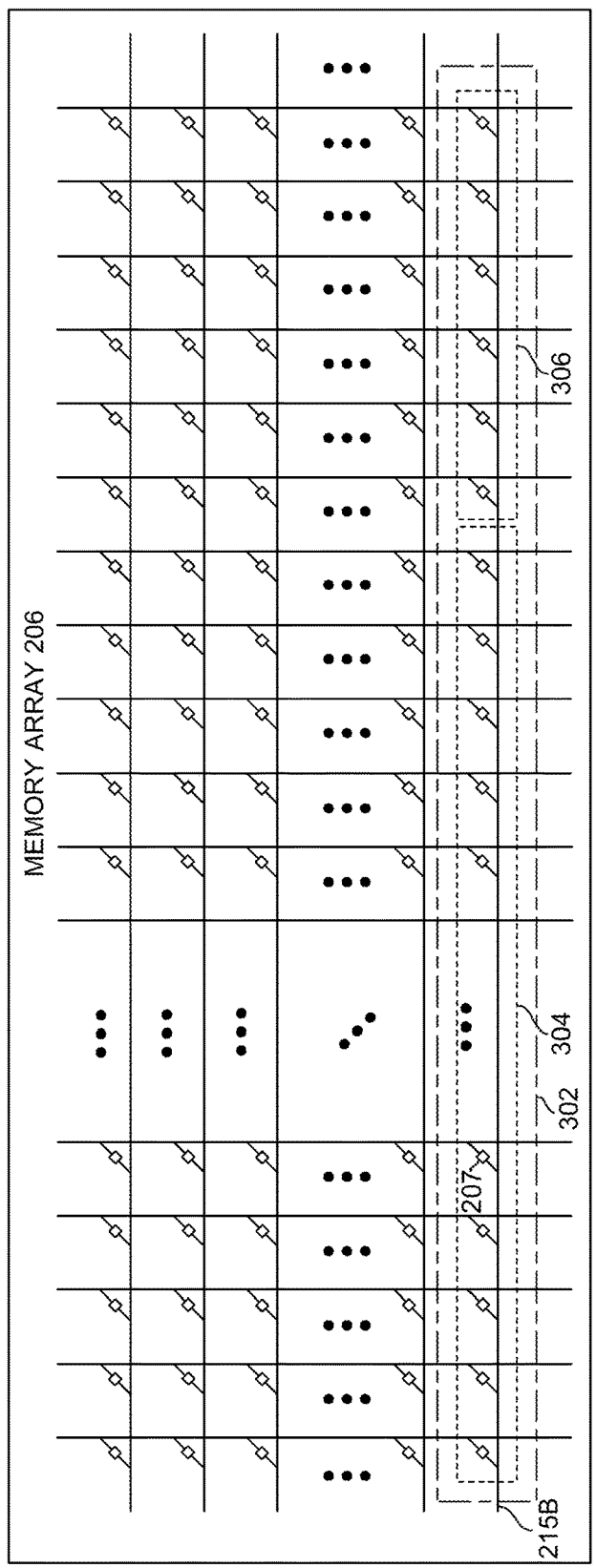
FIG. 3 illustrates a memory array in accordance with certain embodiments.

FIG. 3 illustrates a memory array 206 in accordance with certain embodiments. In various embodiments, a plurality of memory cells 207 of memory array 206 may be divided into a logical group such as a slice 302 (and the memory array 206 may include a plurality of slices). In the embodiment depicted, slice 302 includes a plurality of memory cells 207 coupled to the same WL 215B, though a slice 302 may comprise any suitable arrangement of memory cells.

In a particular embodiment, a slice may include a payload portion 304 and a metadata portion 306. The memory cells of the payload portion 304 may store data written to the storage device 106 by a host (e.g., CPU 102). For example, the host may send a write command specifying payload data to be written to the storage device 106 at a particular logical address. The payload of the write command may be stored in a payload portion 304 of one or more slices 302 (in various embodiments, the payload portion 304 may be large enough to hold payload data from multiple write commands from the host). In various embodiments, the size of the payload portion of a slice may have any suitable size, such as 1 kibibyte (KiB), 2 KiB, 4 KiB, 8 KiB, or other suitable size.

The memory cells of the metadata portion 306 of a slice 302 may store metadata associated with the payload data stored in the payload portion 304 of the slice 302 or the slice itself. The metadata portion 306 may store any suitable metadata associated with the payload data or slice. For example, the metadata portion 306 may store parity bits and/or cyclic redundancy check (CRC) bits used during error detection and error correction, e.g., by the storage device controller 118. In alternative embodiments, error detection and/or correction may be performed at any suitable level on the storage device 106, such as by the chip controllers 126 or partition controllers 210.

Figure 4:
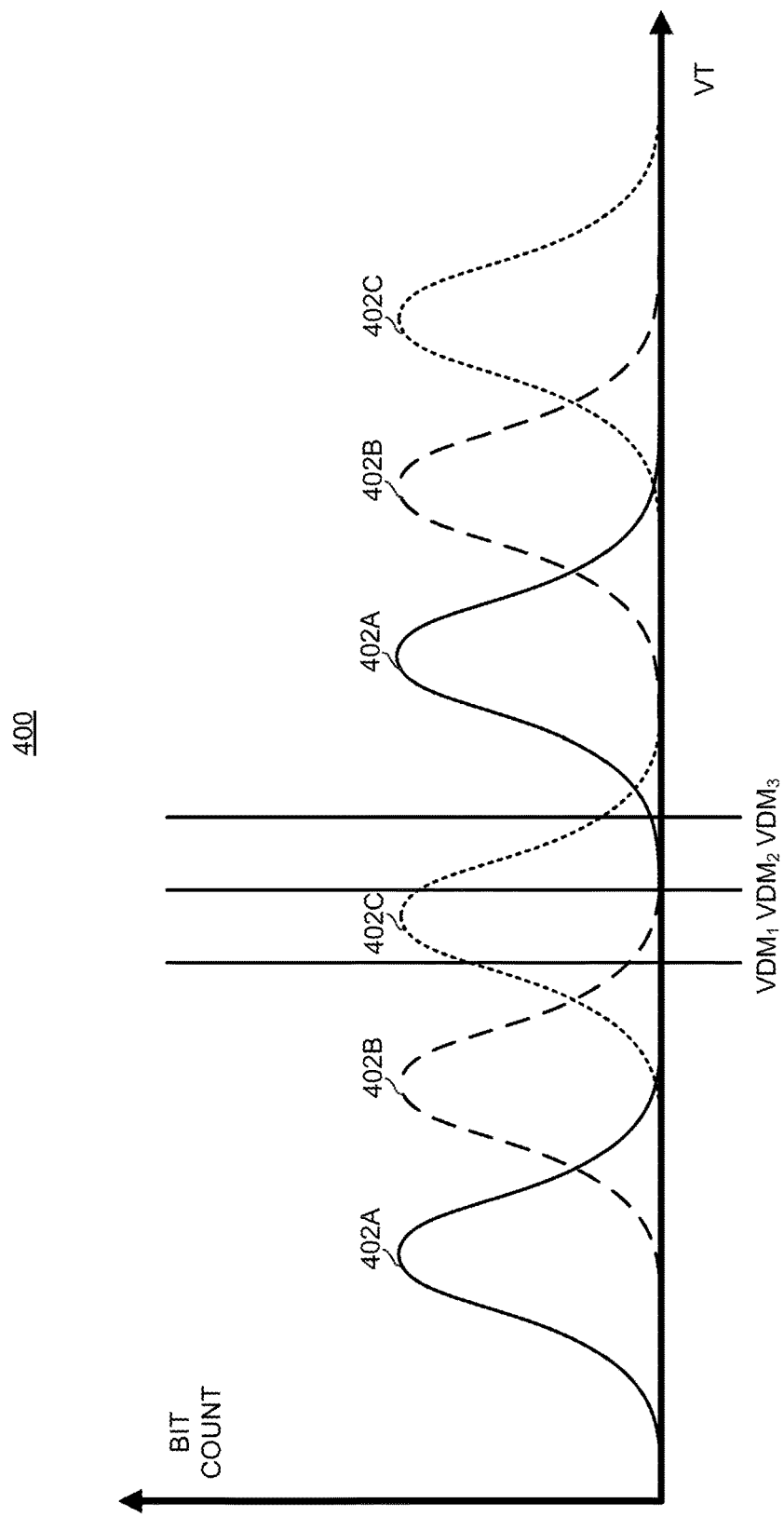
FIG. 4 illustrates a graph depicting memory cell threshold voltage distributions and demarcation voltages in accordance with certain embodiments.

FIG. 4 illustrates a graph 400 depicting memory cell threshold voltage distributions 402 (i.e., 402A-C) and demarcation voltages VDM1, VDM2, and VDM3 in accordance with certain embodiments. The horizontal axis depicts threshold voltages of memory cells of an array and the vertical axis depicts bit counts (i.e., number of memory cells). Thus, each point of a distribution 402 represents a number of cells having a particular threshold voltage. The graph 400 assumes that half of the bits of the array are in a set state (i.e., have a threshold voltage lower than the corresponding VDM) and half of the bits are in a reset state (i.e., have a threshold voltage higher than the corresponding VDM).

Distribution 402A represents a baseline distribution that may correspond to a threshold voltage distribution at a particular point in time (e.g., at the time immediately following a write or read operation performed on the memory cells). Distribution 402B may represent a distribution of the threshold voltages of the cells after a first amount of time has passed without the cells being accessed via a read or write operation. Distribution 402C may represent a distribution after an additional time has passed without the cells being accessed. As the amount of time without cells being accessed increased, the distributions of the threshold voltages of the cells shift to the right.

The VDMs depicted represent a series of VDM values that may be applied during a read operation. During the read operation, VDM1 may be applied and the cells may be sensed. If the sensing operation is unsuccessful (e.g., because too many errors were detected), the VDM may be stepped up (to VDM2) and the sensing operation may be repeated. Any number of VDMs may be applied during a read operation. In various embodiments, if the last VDM (VDM3 in the depicted embodiment) is applied and the sensing operation is still unsuccessful, an alternative error correction operation may be performed or a determination that the read operation was unsuccessful may be made.

The shift in the threshold voltages due to drift may result in read errors as cells that are in the set state (shown on the left side of the graph) may mistakenly be sensed as being in the reset state when one or more of the VDMs are applied. The number of read errors may increase as the time elapsed since the last access rises. Accordingly, the number of errors is extremely high when comparing VDM1 against distribution 402C, but still significant at distribution 402B as well. When the cells have reached distribution 402C, even the highest VDM3 is still lower than the threshold voltages of a significant portion of the memory cells, thus increasing the error rate (as well as the miscorrection rate).

In various embodiments of the present disclosure, when a device-initiated read command is performed, a dummy read operation is first performed before an additional read operation. The dummy read operation may reset the drift of the threshold voltages as long as the VDM is higher than the threshold voltage of the cell. For example, after the dummy read operation is performed on a group of cells having, e.g., distribution 402B or distribution 402C, the distribution of the cells may shift back to 402A. The data read during the dummy read operation is discarded and an additional read operation is performed to obtain the target data. The flow of the device-initiated read command is described in more detail in connection with FIG. 6.

Figure 5:
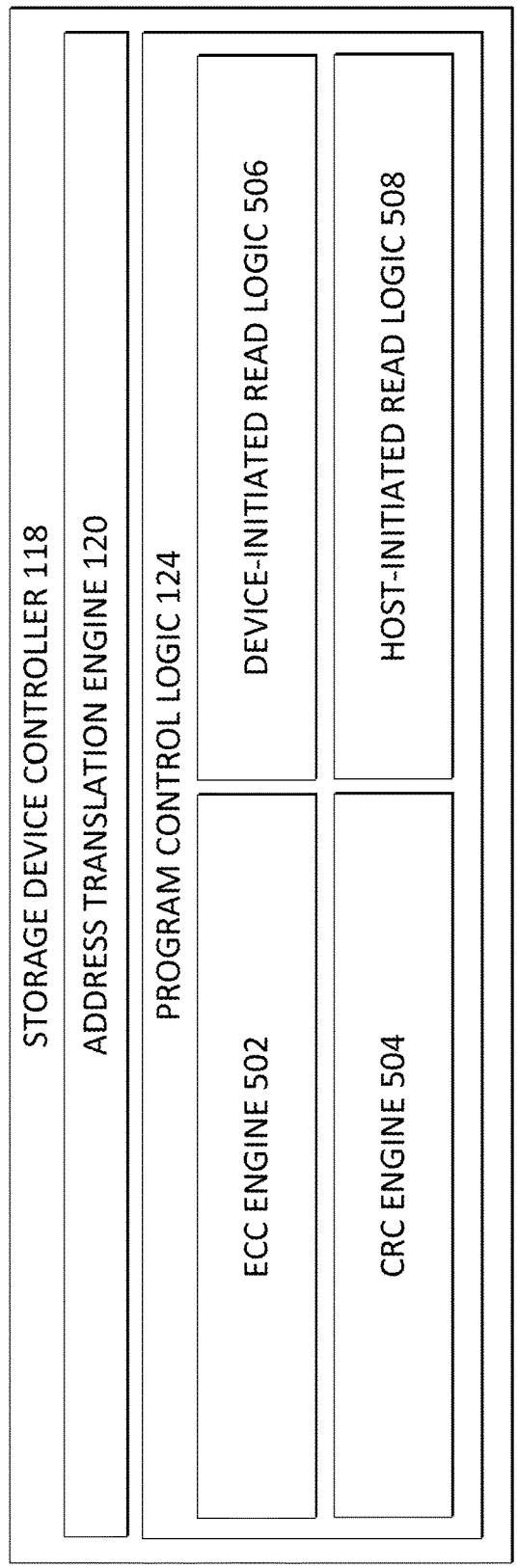
FIG. 5 illustrates a storage device controller 118 to issue device-initiated read commands in accordance with certain embodiments.

FIG. 5 illustrates a storage device controller 118 to issue device-initiated read commands in accordance with certain embodiments. In the embodiment depicted, controller 118 includes address translation engine 120 and program control logic 124. Program control logic 124 includes ECC engine 502, CRC engine 504, device-initiated read logic 506, and host-initiated read logic 508. In various embodiments, logic may be shared between device-initiated read logic 506 and host-initiated read logic 508 to utilize functions of the respective components.

ECC engine 502 includes logic to detect and correct errors in data read from the various partitions 122 of the storage device 106. In various embodiments, when storage device controller 118 receives data from a host device (e.g., CPU 102) to be written to the storage device, the ECC engine 502 (or other suitable logic of the storage device controller 118) may add parity bits to the data to be written. These parity bits are then written along with the data in a memory array 206 of a partition 122 (e.g., the parity bits may be written to the metadata portion 306 of a slice 302 while the data is written to the payload portion 304 of the slice 302).

In various embodiments, when payload data is read from a memory array 206, the data and the parity bits may be provided to the ECC engine 502. The ECC engine 502 may check the parity bits to determine the existence of errors in the data. If the data is deemed to be uncorrectable by the ECC engine (e.g., the number of errors is higher than a threshold), the read command may be reissued, an alternative error correcting scheme may be attempted, the read may be deemed unsuccessful, or other suitable action may be performed. If the ECC deems the errors to be correctable, the ECC engine may attempt to correct the errors (e.g., by manipulating the read data based on the parity bits). In some situations, the ECC engine may deem errors as correctable, but may miscorrect the read data. When such data is subsequently written back to the memory cells, the errors may be locked in (and may later fail a CRC check when the host initiates a read of the data).

CRC engine 504 may perform any suitable data verification operations. In various embodiments, when a host sends a write request for payload data, the write request may include CRC bits which are written to the memory cells along with the payload data. Alternatively, the CRC engine 504 may generate CRC bits from the data based on a CRC algorithm, and these CRC bits may be written with the data. In various embodiments, when a host-initiated read is performed, the CRC bits associated with the payload data are read and returned to the storage device controller 118 along with the payload data. As described above, the payload data may be passed to the ECC engine 502 for error correction and the result may then be passed to the CRC engine 504. The CRC engine may process the data based on a CRC algorithm and determine whether the results match the CRC bits associated with the data. If the results match, the data is then returned to the host. If the results do not match, the read may be retried, an error may be reported to the host, or other suitable action may be performed. In various embodiments, the CRC engine 504 is not utilized for device-initiated read commands (e.g., the overhead associated with the CRC check may be prohibitive for such reads), thus erroneous results from the ECC engine 502 for such reads may go undetected (at least until the host later requests the data and the read data fails the CRC check).

Device-initiated read logic 506 may control the flow of a device-initiated read command. For example, host-initiated read logic 508 may determine when one or more device-initiated read commands are to be issued and may manage the sequence of multiple device-initiated read commands. A device-initiated read command may be issued at any suitable time. For example, device-initiated read logic 506 may monitor an RBER of one or more memory chips 116 or partitions thereof (or an aggregated RBER of all of the memory chips 116) and if the RBER crosses a threshold, the device-initiated read logic 506 may initiate refresh operations across the storage device 116 (or a portion thereof), which may involve reading the memory cells and writing back the read values to the memory cells. For example, a refresh operation may include issuing a read command, obtaining data, and issuing a write command to write back the obtained data. In some embodiments, the refresh operations may be initiated based on a retry threshold (e.g., when a certain percentage of host-initiated read commands trigger rereads, a refresh of the storage device 106 may be triggered). In a particular embodiment, when a drive powers up, device-initiated read logic 506 may sample a plurality of memory locations and determine a reread rate for the sampled data. If the reread rate is sufficiently high, the device-initiated read logic 506 may trigger a refresh of at least a portion of the storage device 106. In various embodiments, device-initiated read logic 506 may periodically cause refresh operations to be performed on the storage device 106 to ensure that a lower RBER is maintained.

In various embodiments, the device-initiated read logic 506 may also communicate payload data as well as parity bits that are read to the ECC engine 502 for error detection and correction. Device-initiated read logic 506 may also effect a dummy read operation by issuing a read command to a target memory chip and ignoring the read data (an additional read command may then be issued for the same location to obtain the data). In an alternative embodiment, device-initiated read logic 506 may effect a dummy read operation by issuing a read command to a target memory chip along with an indication that a dummy read is to be performed and the memory chip may perform the dummy read and discard the results (the target memory chip may then sua sponte perform an additional read or the device-initiated read logic 506 may cause an additional read command to be sent to the target memory chip and the read data may be returned to the device-initiated read logic 506).

Host-initiated read logic 508 may determine when one or more host-initiated read commands have been received and may send corresponding read commands to the target memory chip 116. Host-initiated read logic 508 may also receive the returned read data and communicate payload data as well as parity bits to the ECC engine 502 for error detection and correction. Host-initiated read logic 508 may also pass the output of the ECC engine 502 as well as associated CRC bits to the CRC engine 504 to determine the validity of the read data. Host-initiated read logic 508 may also reissue a read command if the host-initiated read does not pass error correction or the CRC.

Figure 6:
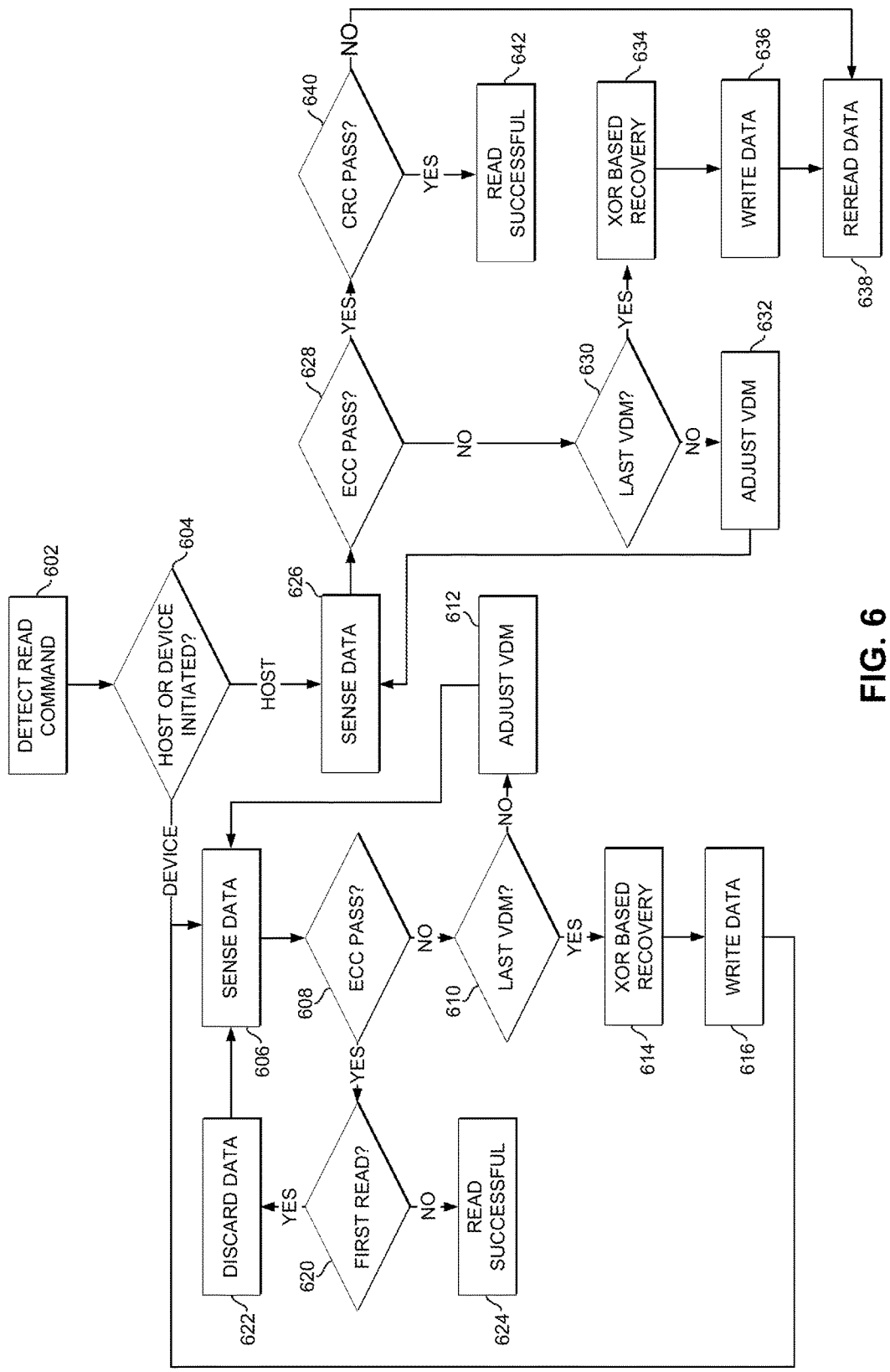
FIG. 6 illustrates an example flow for performing a device-initiated read command utilizing a dummy read operation in accordance with certain embodiments.

FIG. 6 illustrates an example flow for performing a device-initiated read command utilizing a dummy read operation in accordance with certain embodiments. At 602, a read command is detected, e.g., by storage device controller 118. At 604, a determination is made as to whether the read command was initiated by the host or the storage device 106. In response to determination that the read command was initiated by the device, a read operation begins.

At 606, data is sensed. For example, a demarcation voltage may be applied to a plurality of memory cells, and the response of the memory cells may be sensed to determine whether the threshold voltages of the memory cells are above or below the demarcation voltage. At 608, a determination is made as to whether an ECC operation on the read data passes or fails. For example, the sensed data may be provided to ECC engine 502 of the storage device controller 118. The ECC engine may detect errors in the sensed data based, for example, on parity bits that are sensed along with the data. Based on the detected errors, the ECC engine may determine whether or not it can correct the data. If a determination is made by the ECC engine that it cannot correct the data, the flow moves to 610, where a determination is made as to whether the applied VDM is the last VDM to be applied. If a determination is made that the VDM is not the last VDM, the VDM may be adjusted upwards at 612, and the data may be sensed again at 606.

If a determination is made that the VDM is the last VDM to be applied, an alternative data correction scheme, such as an XOR based recovery scheme, may be performed at 614. In various embodiments, the data from any number of slices (or other grouping of data) may be XORed with each other and the results may be stored in a memory chip 116 (e.g., in a slice 302). If the data of a slice becomes corrupted, the stored XOR results may be XORed with the data from the remaining slices to recover the data of the slice that became corrupted. If the alternative data correction scheme is successful, the data is written back to the slice at 616. A second read operation is then performed by adjusting the VDM back to its original value and returning to 606 in the flow to sense data (any time an additional read operation is performed, the read operation may begin by resetting the VDM and sensing the data). In various embodiments, storage device controller 118 may issue an additional read command to the target memory partition to initiate the second read operation.

At 608, if a determination is made that ECC passed, a determination is made at 620 as to whether ECC passed during a first read operation (where a read operation may comprise sensing the data at one or more VDMs). If a determination is made that this is the first read operation, then the read data is discarded at 622 (i.e., because this read operation constitutes the dummy read operation). The data is discarded because, even though ECC passed, there is a possibility that the ECC engine 502 performed a miscorrection on the data. In various embodiments, the data may not be explicitly discarded, but the data may go unused and may be allowed to be overwritten during a subsequent read operation. The flow then returns to 606 where an additional read operation begins. In various embodiments, storage device controller 118 may issue an additional read command to the target memory partition to initiate the second read operation. During a second read operation, when ECC passes at 608, a determination is made that this is not the first read at 620, and the read is deemed successful at 624. The read data may then be used in any suitable purpose. For example, the read data may be rewritten to the location from which it was read as part of a data refresh operation.

At 604, if a determination is made that the read was initiated by a host, the flow moves to 626, where a VDM is applied and data is sensed. At 628, if an ECC operation does not pass, a determination is made at 630 as to whether the VDM applied is the final VDM to be applied. If the VDM is not the final VDM, the VDM may be adjusted upwards at 632 and data may be sensed again at 626. If the VDM is determined at 630 to be the last VDM to be applied, the flow may move to 634 where an XOR based recovery operation is performed. If the XOR based recovery operation is successful, the data is written back to the sense location at 636, and an additional read operation is performed at 638 by returning the flow to 626. In various embodiments, storage device controller 118 may issue an additional read command to the target memory partition to initiate the second read operation.

If the ECC operation passes at 628, the output of the ECC engine 502 may be passed to CRC engine 504, and a determination is made at 640 as to whether the CRC passed. If the CRC did not pass (indicating that the ECC engine 502 produced an erroneous result), the flow moves to 638 where an additional read operation is performed. If the CRC passes at 640, the read is deemed successful at 642, and the read data may be returned to the host.

In various embodiment, the flow may be modified. For example, instead of iterating through multiple VDMs until ECC passes during the first (i.e., dummy) read operation for the device-initiated read requests, a single VDM (e.g., $VDM_3$) or other voltage sufficient to reset the drift on the target memory cells may be applied (with or without an actual sensing operation). A normal read operation may then be initiated to obtain the targeted data.

The flow described in FIG. 6 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 6 may be repeated, combined, modified or deleted where appropriate. Additionally, operations may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the functionality of the various components such as CPU 102, external I/O controller 104, processor 108, cores 114A and 114B, I/O controller 110, CPU memory controller 112, storage device 106, system memory device 107, memory chip 116, storage device controller 118, address translation engine 120, memory partition 122, program control logic 124, chip controller 126, memory array 206, memory partition controller 210, word line control logic 214, bit line control logic 216, ECC engine 502, CRC engine 504, device-initiated read logic 506, host-initiated read logic 508, or other entity or component described herein, or subcomponents of any of these. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In at least one embodiment, an apparatus comprises a memory array comprising a plurality of phase change memory (PCM) cells; and a controller to determine to read data stored by the plurality of PCM cells independent of a read command from a host device; and in response to the determination to read data stored by the plurality of PCM cells independent of a read command from a host device, perform a dummy read operation on the plurality of PCM cells, and perform an additional read operation on the plurality of PCM cells.

In an embodiment, the controller is to discard data read during the dummy read operation. In an embodiment, the controller is to discard data read by the dummy read operation after a determination that the data has passed an error correction operation. In an embodiment, the controller is to write data read by the additional read operation into the plurality of PCM cells. In an embodiment, performance of the dummy read operation comprises sensing the plurality of PCM cells and performing error correction on data sensed from the plurality of PCM cells. In an embodiment, the controller is to perform error correction and a cyclic redundancy check on data read in response to a read command received from the host device; and perform error correction but not perform a cyclic redundancy check on data read in response to the determination to read data stored by the plurality of PCM cells. In an embodiment, the controller is to apply a plurality of demarcation voltages to the plurality of PCM cells during the dummy read operation. In an embodiment, the memory array comprises a three dimensional crosspoint memory array. In an embodiment, the controller is to determine to read data stored by the plurality of PCM cells independent of a read command from a host device in response to a detection that the apparatus has been powered up. In an embodiment, the controller is to determine to read data stored by the plurality of PCM cells independent of a read command from a host device in response to a detection that a raw bit error rate of a plurality of read operations has crossed a threshold. In an embodiment, performance of the dummy read operation comprises performance of an XOR based data recovery operation. In an embodiment, an apparatus further comprises a battery communicatively coupled to a processor, a display communicatively coupled to the processor, or a network interface communicatively coupled to the processor.

In at least one embodiment, a method comprises determining to read data stored by a plurality of memory cells independent of a read command from a host device; and in response to determining to read data stored by the plurality of memory cells independent of a read command from a host device, performing a dummy read operation on a plurality of memory cells; and performing an additional read operation on the plurality of memory cells.

In an embodiment, a method further comprises discarding data read during the dummy read operation. In an embodiment, a method further comprises discarding data read by the dummy read operation after a determination that the data has passed an error correction operation. In an embodiment, a method further comprises writing data read by the additional read operation into the plurality of memory cells. In an embodiment, a method further comprises during performance of the dummy read operation, sensing the plurality of memory cells and performing error correction on data sensed from the plurality of memory cells. In an embodiment, a method further comprises performing error correction and a cyclic redundancy check on data read in response to a read command received from the host device; and performing error correction but not performing a cyclic redundancy check on data read in response to the determination to read data stored by the plurality of memory cells. In an embodiment, a method further comprises applying a plurality of demarcation voltages to the plurality of memory cells during the dummy read operation. In an embodiment, the memory array comprises a three dimensional crosspoint memory array. In an embodiment, a method further comprises determining to read data stored by the plurality of memory cells independent of a read command from a host device in response to a detection that the apparatus has been powered up. In an embodiment, a method further comprises determining to read data stored by the plurality of memory cells independent of a read command from a host device in response to a detection that a raw bit error rate of a plurality of read operations has crossed a threshold. In an embodiment, performance of the dummy read operation comprises performance of an XOR based data recovery operation.

In at least one embodiment, a non-transitory machine readable storage medium includes instructions stored thereon, the instructions when executed by a machine to cause the machine to determine to read data stored by a plurality of memory cells independent of a read command from a host device; and in response to the determination to read data stored by the plurality of memory cells independent of a read command from a host device, perform a dummy read operation on the plurality of memory cells; and perform an additional read operation on the plurality of memory cells.

In an embodiment, the instructions when executed cause the machine to discard data read during the dummy read operation. In an embodiment, the instructions when executed cause the machine to write data read by the additional read operation into the plurality of memory cells. In an embodiment, performance of the dummy read operation comprises sensing the plurality of memory cells and performing error correction on data sensed from the plurality of memory cells.

In at least one embodiment, a system comprises means for determining to read data stored by a plurality of memory cells independent of a read command from a host device; means for, in response to determining to read data stored by the plurality of memory cells independent of a read command from a host device, performing a dummy read operation on the plurality of memory cells; and performing an additional read operation on the plurality of memory cells.

In an embodiment, a system further comprises means for discarding data read during the dummy read operation. In an embodiment, a system further comprises means for writing data read by the additional read operation into the plurality of memory cells. In an embodiment, a system further comprises means for, during the performance of the dummy operation, sensing the plurality of memory cells and performing error correction on data sensed from the plurality of memory cells.

In at least one embodiment, a system comprises a controller to determine to read data stored by a plurality of memory cells of an array independent of a read command from a host device; and in response to the determination to read data stored by the plurality of memory cells of the array independent of a read command from a host device, perform a dummy read operation on the plurality of memory cells; and perform an additional read operation on the plurality of memory cells.

In an embodiment, a system further comprises the array of memory cells. In an embodiment, the system further comprises a central processing unit of the host device, the central processing unit to send a read command to the controller. In an embodiment, a system further comprises a battery communicatively coupled to the central processing unit, a display communicatively coupled to the central processing unit, or a network interface communicatively coupled to the central processing unit.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a memory array comprising a plurality of phase change memory (PCM) cells; and a controller to:
  determine to read data stored by the plurality of PCM cells independent of a read command from a host device; and
  in response to the determination to read data stored by the plurality of PCM cells independent of a read command from a host device:
    perform a dummy read operation on the plurality of PCM cells;
    perform an additional read operation on the plurality of PCM cells;
    perform an error correction operation on data read by the additional read operation; and
    write data corrected by the error correction operation into the plurality of PCM cells to overwrite the data read by the additional read operation.

2. The apparatus of claim 1, the controller to discard data read during the dummy read operation.

3. The apparatus of claim 1, the controller to discard data read by the dummy read operation after a determination that the data has passed an error correction operation.

4. The apparatus of claim 1, the controller to write data read by the additional read operation into the plurality of PCM cells.

5. The apparatus of claim 1, wherein performance of the dummy read operation comprises sensing the plurality of PCM cells and performing error correction on data sensed from the plurality of PCM cells.

6. The apparatus of claim 1, the controller to:
  perform error correction and a cyclic redundancy check on data read in response to a read command received from the host device; and
  perform error correction but not perform a cyclic redundancy check on data read in response to the determination to read data stored by the plurality of PCM cells.

7. The apparatus of claim 1, the controller to apply a plurality of demarcation voltages to the plurality of PCM cells during the dummy read operation.

8. The apparatus of claim 1, the memory array comprising a three dimensional crosspoint memory array.

9. The apparatus of claim 1, the controller to determine to read data stored by the plurality of PCM cells independent of a read command from a host device in response to a detection that the apparatus has been powered up.

10. The apparatus of claim 1, the controller to determine to read data stored by the plurality of PCM cells independent of a read command from a host device in response to a detection that a raw bit error rate of a plurality of read operations has crossed a threshold.

11. The apparatus of claim 1, wherein performance of the dummy read operation comprises performance of an XOR based data recovery operation.

12. The apparatus of claim 1, further comprising a battery communicatively coupled to a processor, a display communicatively coupled to the processor, or a network interface communicatively coupled to the processor.

13. A method comprising:
  determining to read data stored by a plurality of phase change memory (PCM) cells independent of a read command from a host device; and
  in response to determining to read data stored by the plurality of memory cells independent of a read command from a host device:
    performing a dummy read operation on the plurality of memory cells;
    performing an additional read operation on the plurality of memory cells;
    performing an error correction operation on data read by the additional read operation; and
    writing data corrected by the error correction operation into the plurality of PCM cells to overwrite the data read by the additional read operation.

14. The method of claim 13, further comprising discarding data read during the dummy read operation.

15. The method of claim 13, further comprising writing data read by the additional read operation into the plurality of memory cells.

16. The method of claim 13, further comprising, during performance of the dummy read operation, sensing the plurality of memory cells and performing error correction on data sensed from the plurality of memory cells.

17. A non-transitory machine readable storage medium having instructions stored thereon, the instructions when executed by a machine to cause the machine to:
  determine to read data stored by a plurality of phase change memory (PCM) cells independent of a read command from a host device; and
  in response to the determination to read data stored by the plurality of memory cells independent of a read command from a host device:
    perform a dummy read operation on the plurality of memory cells;
    perform an additional read operation on the plurality of memory cells;
    perform an error correction operation on data read by the additional read operation; and
    write data corrected by the error correction operation into the plurality of PCM cells to overwrite the data read by the additional read operation.

18. The medium of claim 17, the instructions when executed to cause the machine to discard data read during the dummy read operation.

19. The medium of claim 17, the instructions when executed to cause the machine to write data read by the additional read operation into the plurality of memory cells.

20. The medium of claim 17, wherein performance of the dummy read operation comprises sensing the plurality of memory cells and performing error correction on data sensed from the plurality of memory cells.

21. A system comprising:
  a controller to:
    determine to read data stored by a plurality of phase change memory (PCM) cells of an array independent of a read command from a host device; and
    in response to the determination to read data stored by the plurality of memory cells of the array independent of a read command from a host device:
      perform a dummy read operation on the plurality of memory cells;
      perform an additional read operation on the plurality of memory cells;
      perform an error correction operation on data read by the additional read operation; and
      write data corrected by the error correction operation into the plurality of PCM cells to overwrite the data read by the additional read operation.

22. The system of claim 21, further comprising the plurality of PCM cells.

23. The system of claim 21, further comprising a central processing unit of the host device, the central processing unit to send a read command to the controller.

24. The system of claim 23, further comprising a battery communicatively coupled to the central processing unit, a display communicatively coupled to the central processing unit, or a network interface communicatively coupled to the central processing unit.

\* \* \* \* \*